United States Patent
Patterson et al.

(10) Patent No.: US 6,202,125 B1
(45) Date of Patent: *Mar. 13, 2001

(54) PROCESSOR-CACHE PROTOCOL USING SIMPLE COMMANDS TO IMPLEMENT A RANGE OF CACHE CONFIGURATIONS

(75) Inventors: Dan Patterson, Sunnyvale; Bindi Prasad, Los Altos, both of CA (US); Gurbir Singh, Portland; Peter MacWilliams, Aloha, both of OR (US); Steve Hunt, Felton, CA (US); Phil G. Lee, Aloha, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/851,845

(22) Filed: May 6, 1997

Related U.S. Application Data

(63) Continuation-in-part of application No. 08/757,959, filed on Nov. 25, 1996, now Pat. No. 5,678,020.

(51) Int. Cl.[7] .................................................. G06F 12/00
(52) U.S. Cl. .............................. 711/118; 711/3; 711/119; 711/122; 711/133; 711/100
(58) Field of Search ..................................... 711/113, 118, 711/119, 122, 133, 136, 141, 144, 159, 160, 170, 100, 3

(56) References Cited

U.S. PATENT DOCUMENTS

| | | |
|---|---|---|
| 3,766,532 | 10/1973 | Liebel, Jr. . |
| 4,141,067 | 2/1979 | McLagan . |
| 4,323,967 | 4/1982 | Peters et al. . |
| 4,342,069 * | 7/1982 | Link ....................................... 361/764 |
| 4,371,927 * | 2/1983 | Wilhite et al. ........................ 711/137 |
| 4,646,237 * | 2/1987 | Allen .................................... 395/287 |
| 4,755,930 | 7/1988 | Wilson, Jr. et al. . |
| 4,969,122 | 11/1990 | Jensen . |
| 5,025,366 | 6/1991 | Baror . |
| 5,058,006 | 10/1991 | Durdan et al. . |
| 5,136,700 | 8/1992 | Thacker . |
| 5,155,067 | 10/1992 | Wood et al. . |
| 5,193,163 | 3/1993 | Sanders et al. . |
| 5,249,282 | 9/1993 | Segers . |
| 5,251,308 | 10/1993 | Frank et al. . |

(List continued on next page.)

OTHER PUBLICATIONS

Baer, et al., "On the Inclusion Properties for Multi–level Cache Hierarchies," 1988, pp. 73–80.

Popescu, et al., "The Metaflow Architecture," IEEE Micro, Jun. 1991, pp. 10–13 and 63–73.

IEEE Standard for Low–Voltage Differential Signals (LVDS) for Scalable Coherent Interface (SCI), IEEE Std 1596.3–1996, Jul. 31, 1996, pp. 1–30.

Uchiyama, et al., "Design of a Second–Level Cache Chip for Shared–Bus Multimicroprocessor Systems, " IEEE 1991, pp. 566–571.

* cited by examiner

*Primary Examiner*—Ario Etienne
(74) *Attorney, Agent, or Firm*—Blakely, Sokoloff, Taylor & Zafman LLP

(57) ABSTRACT

A computer system having a processor-cache protocol supporting multiple cache configurations is described. The computer system has a processor having a cache control circuit to control multiple cache memory circuits. The processor including its cache control circuit is coupled to a cache bus. A second level cache memory is also coupled to the cache bus. The cache control circuit controls the second level cache by issuing commands that are executed by the second level cache.

36 Claims, 11 Drawing Sheets

U.S. PATENT DOCUMENTS

| | | |
|---|---|---|
| 5,265,235 | 11/1993 | Sindhu et al. . |
| 5,287,484 | 2/1995 | Nishii et al. . |
| 5,297,269 | 3/1994 | Donaldson et al. . |
| 5,303,362 | 4/1994 | Butts, Jr. et al. . |
| 5,317,716 | 5/1994 | Liu . |
| 5,319,766 | 6/1994 | Thaller et al. . |
| 5,325,503 | 6/1994 | Stevens et al. . |
| 5,325,504 | 6/1994 | Tipley et al. . |
| 5,345,576 | 9/1994 | Lee et al. . |
| 5,353,424 | 10/1994 | Partovi et al. . |
| 5,361,267 | 11/1994 | Godiwala et al. . |
| 5,369,753 | 11/1994 | Tipley . |
| 5,388,224 | 2/1995 | Maskas . |
| 5,390,311 | 2/1995 | Fu et al. . |
| 5,414,828 | 5/1995 | Yarkoni et al. . |
| 5,434,993 | 7/1995 | Liencres et al. . |
| 5,446,863 | 8/1995 | Stevens et al. . |
| 5,454,088 | 9/1995 | Nakagawa . |
| 5,454,093 | 9/1995 | Abdulgafiz et al. . |
| 5,465,342 * | 11/1995 | Walsh .................................. 711/119 |
| 5,524,233 | 6/1996 | Milburn et al. . |
| 5,530,833 * | 6/1996 | Tyengar et al. ...................... 711/128 |
| 5,615,167 * | 3/1997 | Jain et al. ....................... 365/230.08 |
| 5,678,020 | 10/1997 | Singh et al. . |
| 5,692,152 * | 11/1997 | Cohen et al. ......................... 711/122 |
| 5,761,516 | 6/1998 | Rostoker et al. .................... 710/260 |
| 5,943,284 * | 8/1999 | Mizuno et al. .................. 365/230.03 |

PROCESSOR-CACHE PROTOCOL USING SIMPLE COMMANDS TO IMPLEMENT A RANGE OF CACHE CONFIGURATIONS

This is a continuation-in-part of application Ser. No. 08/757,959 filed Nov. 25, 1996, now U.S. Pat. No. 5,678,020.

FIELD OF THE INVENTION

The present invention relates to the field of computer systems; more particularly, the present invention relates to the field of cache memory arrangements in which a cache controller controls multiple cache memories at the same time and is compatible with multiple types of cache memories.

BACKGROUND

Cache controllers require very complicated logic and most computer systems contain two such controllers, one to control the first level (L1) cache within the processor and the other to control the second level (L2) cache in the system. The design of these two controllers is a compromise between performance and complexity of state that must be shared between them. A system of hierarchical caches would provide a higher overall performance if the cache controllers had access to information about accesses to all cache memories, along with information regarding the processor state and external bus accesses. This is clearly not possible when the cache controller for the L2 cache memory is separate from the L1 cache controller.

Also, in the prior art, processors communicate with cache controllers and L2 cache memory by asserting and deasserting signals at specific pins. For example, a read is requested by asserting the read pin while sending the requested address to the L2 cache memory. Thus, access to the cache memory begins when the signals are asserted or deasserted. In other words, prior art L2 cache memories do not receive commands to be decoded and executed.

Furthermore, prior art L2 caches are not designed to support more than one cache-processor architecture.

That is, prior art cache configurations are designed for specific processors or processor families. Different cache configurations typically are made having different balances between performance and cost. Because a cache configuration is designed for use with a specific processor family, the cost/performance balance of a computer system sought by the user may not be available. In fact, because of this dependence on a particular type of processor, the cache memory configuration cannot be upgraded with advances in technology independently of upgrading the processor. Thus, it is desirable to have a processor that is compatible with multiple types of cache organizations, including the option of operating without a cache memory (if so desired). Therefore, as the different organizations are upgraded, the microprocessor may not have to undergo any changes itself.

SUMMARY OF THE INVENTION

A computer system having a processor-cache protocol supporting multiple cache configurations is described. The computer system includes a processor having a cache control circuit to control multiple cache memory circuits. The processor is coupled to a cache bus. A second level cache memory is also coupled to the cache bus. The cache control circuit controls the second level cache by issuing commands from a set of commands that are decoded and executed by the second level cache memory.

DETAILED DESCRIPTION

A cache memory subsystem for use in a computer system is described. In the following detailed description numerous specific details are set forth, such as specific numbers of bits, command and signal names, etc., in order to provide a thorough understanding of the invention. However, it will be understood by one skilled in the art that the present invention may be practiced without these specific details. In other instances, well-known structures and devices are shown in block diagram form, rather than in detail, in order to avoid obscuring the invention.

The present invention provides a protocol and interface to allow a single integrated circuit (IC) die to control multiple IC dice containing cache memory. According to one embodiment, the dice that are controlled are located in separate packages. Alternatively, multiple dice may be contained within a single integrated circuit package, such that the single die controls the operations of the dice within the package, including its own control. The single die is able to provide control for other dice due to the partitioning of functionality between the dice. The control function of the dice is partitioned, such that the control necessary to monitor and start operations on other dice is placed on a single die, while the control needed to perform a specific function on a die remains on the die that performs the specific function. In this manner, a single die is able to control what the other dice are doing, while the other dice are performing the functions themselves.

The interface and protocol comprises a set of simple commands, referred to as micro-operations, that allow implementation of a range of cache configurations. Micro-operations are issued to cache memory from cache control logic on a microprocessor die. By implementing a predefined interface between the processor and cache dice with defined commands, the present invention allows for upgrading of cache memory by replacing the cache memory. Also, because micro-operations are decoded and executed by the cache memory, the microprocessor may process other non-cache instructions while the cache memory processes cache operations.

Figure 1:
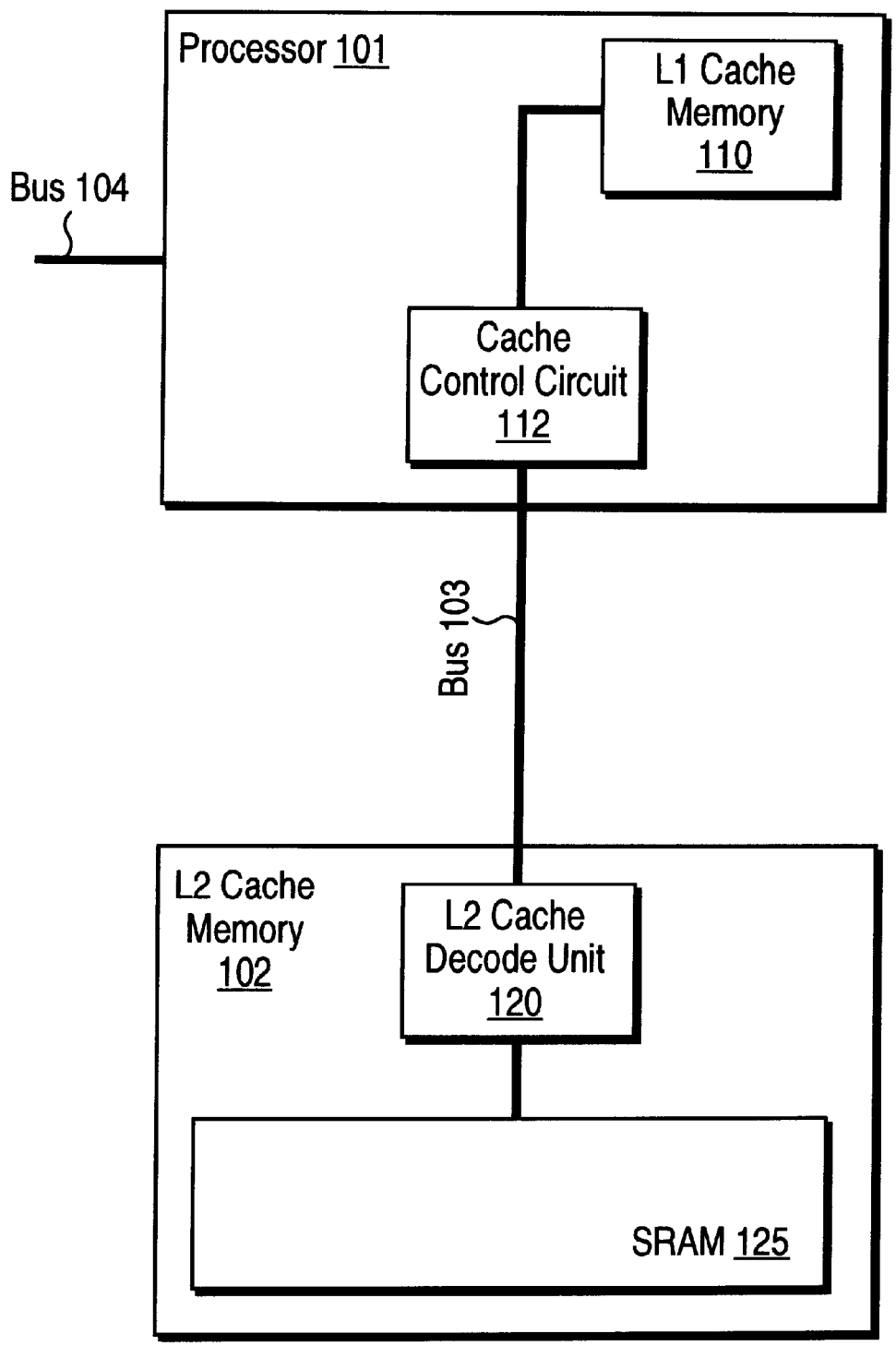
FIG. 1 is a block diagram of one embodiment of a cache memory system with a dedicated cache bus according to the present invention.

FIG. 1 is a block diagram of one embodiment of a processor and L2 cache memory arrangement of the present invention. Processor 101 is coupled to L2 cache memory 102 by dedicated cache bus 103. Processor 101 is also coupled to system bus 104. Processor 101 and L2 cache memory 102 may be contained in separate packages or processor 101 and L2 cache memory 102 may be contained in a dual cavity integrated circuit package. In the present invention, processor 101 contains cache control circuit 112, which provides the functionality for controlling both an L1 cache 110 contained in processor 101 and L2 cache memory 102.

In one embodiment, L2 cache memory 102 comprises L2 cache decode unit 120. L2 cache decode unit 120 decodes commands (also referred to as micro-operations) to control L2 cache memory 102 according to the commands issued by processor 101. As a result of decoding, the L2 cache decode unit 120 generates one or more signals to access information stored in the L2 cache memory 102. In one embodiment, the information may include data. The information may also include tag information, cache coherency state information, instruction information, etc. Thus, subsequent to decoding, L2 cache memory 102 executes commands by using generated access signals to access information stored in L2 cache memory 102. The generated access signals may be coupled between the L2 cache decode unit 120 and a storage area such as a tag RAM, data RAM, register, storage area or other memory element in L2 cache memory 102 which stores the information. These have not been shown to avoid obscuring the present invention. L2 cache decode unit 120 also returns results generated by execution of the commands to processor 101 via dedicated cache bus 103. By sending commands to the L2 cache to be decoded and executed, the processor may process additional instructions from a program, which increases overall system performance. L2 cache memory 102 may optionally include a static random access memory (SRAM) that stores data, a cache directory and cache management logic; however, other types of memory may be used. The data is stored in a data storage array in the SRAM. The cache directory may include a tag array, tag status and least recently used (LRU) bits. The cache management logic includes the logic to perform tag matching, a replacement algorithm and data routing.

In one embodiment, the L2 cache memory 102 communicates with processor 101 using dedicated cache bus 103. In one embodiment, dedicated cache bus 103 includes a bi-directional address bus for sending addresses between processor 101 and L2 cache memory 102, a bi-directional data bus, a command bus for sending commands from processor 101 to L2 cache memory 102 and a response bus. However, other bus configurations may also be used, such as a shared bus or any bus coupling a processor to a cache that allows for commands to be transferred from the processor to the cache memory to control the cache memory.

Figure 2:
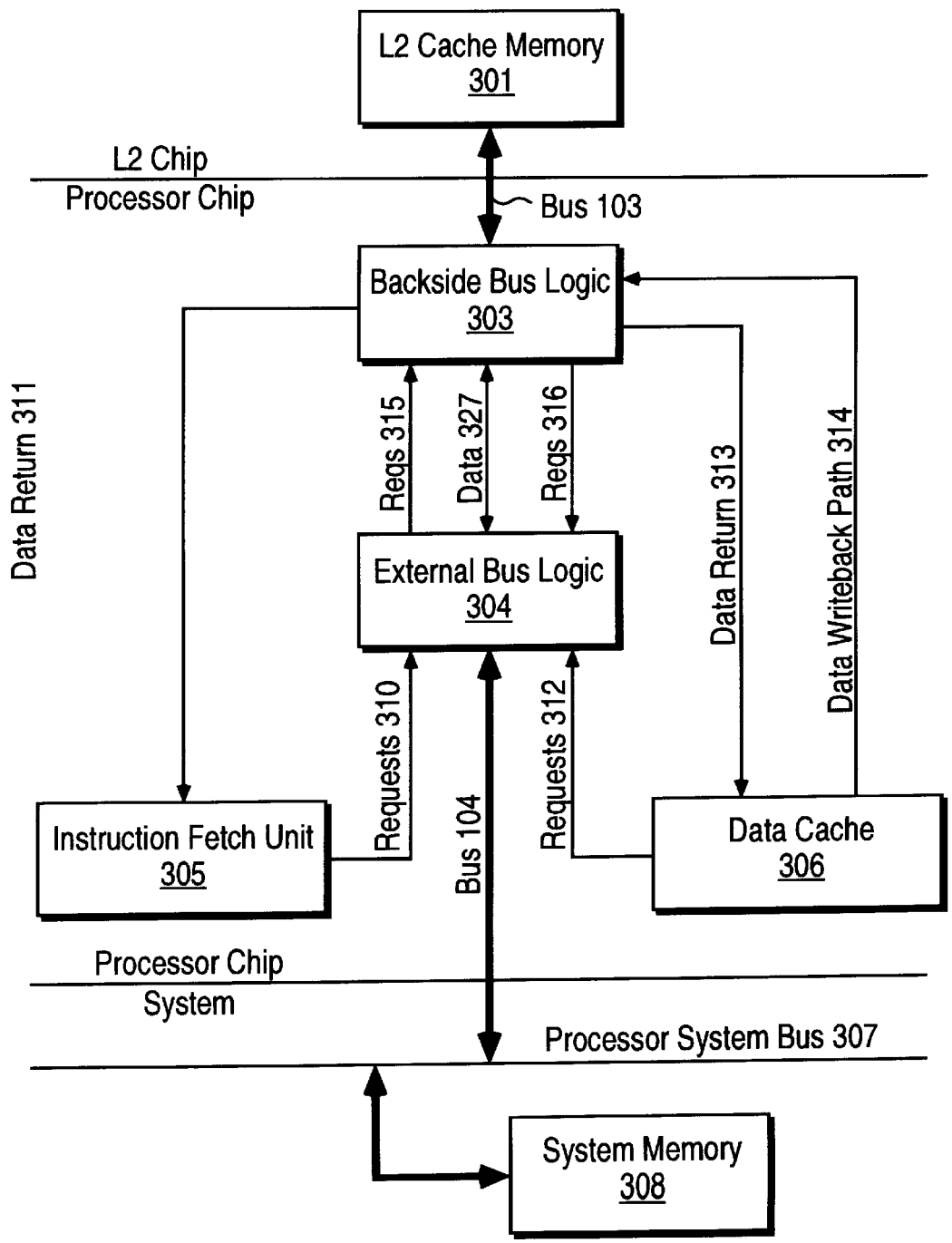
FIG. 2 is a block diagram of one embodiment of a memory subsystem of a computer system implemented according to the present invention.

FIG. 2 is a block diagram of a memory subsystem of the computer system of the present invention. Boundary lines are shown to define the portion of the memory subsystem that is contained within the processor and that portion which is external to the processor. Referring to FIG. 2, L2 cache memory 301 is coupled to dedicated cache bus 103. Dedicated cache bus 103 is also coupled to dedicated cache bus logic (BBL) 303. BBL 303 is coupled to external bus logic 304, instruction fetch unit (IFU) 305 and the data cache unit (DCU) 306. External bus logic 304 is coupled to IFU 305, DCU 306 and processor system bus 307. System memory 308 is coupled to processor system bus 307.

IFU 305 includes instruction fetch logic as well as the instruction cache and fetches instructions for execution in the processor. When the instruction cache of IFU 305 desires to fetch more instructions, it sends a request on request lines 310 to external bus logic 304. External bus logic 304 sends the request on request lines 315 to BBL 303, which forwards the request to L2 cache memory 301. In response, L2 cache memory 301 performs a read operation. If there is a hit in L2 cache memory 301, the instructions are returned to IFU 305 on the data return signal lines 311 from BBL 303 and dedicated cache bus 103.

DCU 306 holds temporary copies of data for use by the processor in executing instructions. In one embodiment, DCU 306 comprises an L1 cache memory. Note that the present invention may be applied to an instruction cache or a cache that stores both instructions and data at the same time.

In executing instructions, if the data is not in DCU 306 (i.e., the L1 cache), a request is made on request lines 312 to external bus logic 304. External bus logic 304 sends a request on request lines 315 to BBL 303 which forwards the request onto L2 cache memory 301. If the data is in L2 cache memory 301 (if L2 cache memory 301 hits), then the data is forwarded and returned to DCU 306 on data return lines 313. When data is written back from DCU 306, data is sent out on data writeback path 314 to dedicated cache bus 103 via BBL 303 to L2 cache memory 301.

If data from L2 cache memory 301 is to be written back to system memory 308, a request is made to external bus logic 304 via request lines 316 from BBL 303. The data is written from dedicated cache bus 103 through BBL 303 to external bus logic 304 via data path 327. External bus logic 304 controls the data by writing the data on bus 104 to system memory 308 via processor system bus 307. When there is a miss to L2 cache memory 301, external bus logic 304 sends the request to system memory 308 using bus 104 and processor system bus 307. The data returned is received by external bus logic 304 and sent to BBL 303 via data path 327 for storage in L2 cache memory 301. The data is also written to DCU 306 via data return lines 313 and to L2 cache memory 301 via dedicated cache bus 103. Note that in another embodiment L2 cache 301 may also be coupled to processor system bus 307 and commands sent from the processor, which are decoded and executed by L2 cache memory 301, cause L2 cache memory 301 to write data directly to processor system bus 307. Note that for reasons discussed below, such an additional coupling may not be entirely desirable.

Processor accesses from IFU 305 are always fetch operations that do not modify the data. Similarly, read operations from the data cache 306 that are generated by the processor executing a read operation are always data fetch operations. These requests are forwarded to processor system bus 307, if they miss L2 cache memory 301, as read operations from the memory. When the data is returned by system memory 308, a signal on processor system bus 307 indicates if copies of this data also exist in other cache memories in a multiple processor system. If they do, then the data is placed in L2 cache memory 301 and DCU 306 and marked with a state of Shared (S). On the other hand, if no other cache memory has a copy of the data as indicated on processor system bus 307, the data can be placed in L2 cache memory 301 and DCU 306 and marked Exclusive (E).

When the processor modifies data, it issues a request to DCU 306 to obtain a copy of the data with complete ownership. If the data is not present in DCU 306, a similar request is sent to L2 cache memory 301. If the request also misses L2 cache memory 301, it is then forwarded to processor system bus 307 as a data read request with a command modifier indicating to all other processors on processor system bus 307 that they must relinquish ownership of this cache line of data and invalidate all copies of the line in their cache memories. The data is then returned to the requesting processor granting it exclusive ownership and is placed in L2 cache memory 301 and DCU 306 in the Modified (M) state. The processor is then free to update any portion of the cache line it chooses. This results in a write command being issued to DCU 306 with the modified data and DCU 306 updates its copy of the cache line to reflect the change.

By integrating the control for L2 cache memory 301 into the processor, the present invention is able to better coordinate the activities and transactions that occur in the computer system as a function of the type of cache memory connected to the processor. The single control of the processor is functionally positioned with respect to DCU 306, L2 cache memory 301 and the processor system bus 307 to allow the controller to obtain information and respond, if necessary, to any transaction on the three ports (DCU 306, L2 cache memory 301 and the processor system bus 307) that is currently in progress. The controller of the present invention can optimize the transactions sourced from one or more of DCU 306, L2 cache memory 301 and processor system bus 307 to improve performance.

Controlling the L2 Cache Memory

The processor of the present invention controls the functionality of the L2 cache memory, such that the L2 cache memory is a slave on the dedicated cache bus. That is, the control of the L2 cache memory is partitioned between the processor and the L2 cache memory in such a way that the processor of the present invention controls what the L2 cache memory is doing (e.g., whether the L2 cache memory is transferring data). In one embodiment, the processor uses the same control logic to control both the L1 and the L2 caches. By using the same control logic, cost and complexity of the system is reduced and better overall performance is obtained. In the present invention, the processor controls the L2 cache memory using micro-operations sent by the processor to the L2 cache memory.

The processor controls the L2 cache memory behavior through micro-operations which provide the functionality needed for all processor requests to L2 cache memory. These micro-operations function within the confines of the interface provided between the processor and the L2 cache memory in order to implement single die control in a multi-chip system. A brief description of one embodiment of micro-operations performed by the L2 cache memory is given below.

Data Line Read with LRU Update (RLU): This command is used by the processor to lookup a line in the L2 cache memory, and upon an L2 hit, read the data from the L2 cache memory. This command also updates the LRU field in the L2 cache memory.

Data Half Line Read with LRU (RHU): This command operates in the same manner as the RLU command except that half of a cache line is returned to the processor.

Tag Read with Line Read (TRR): This command is used to read the entire content of a line in cache memory. The processor provides the set and way address to cache memory and cache memory returns the tag, state and data of the requested line.

Tag Write with Line Read (TWR): This command is used to update the state of a specific line while reading its data content for the purpose of returning it out to the system bus. The processor provides the set and way address and the new state to cache memory and cache memory returns the data at the requested location.

Tag Write with Data Write (TWW): The processor uses this command to write the entire content of a cache line and its tag into cache memory. The processor provides the set, tag, chunk and way addresses along with the state and data to cache memory. Cache memory stores the information at the address requested. Other than a possible error message, no information is returned by the L2 cache.

Tag Write With Half Data Write (TWH): This command operates in the same manner as the TWW command except half of a cache line is stored in cache memory.

Tag Write with Chunk Data Write (TWC): This command operates in the same manner as the TWW command except a chunk (8 bytes) of data is stored in cache memory.

Tag Write (TW): The processor uses this command to update the tag and state of a cache line. The processor provides the set, tag and way addresses along with the new state to cache memory. Cache memory stores the new tag and state information at the addressed location and does not return any information other than a possible error indication.

Tag Inquire (TI): The processor uses this command to determine if cache memory contains data at a particular location. The processor provides the set and tag address to cache memory, which returns a hit/miss indication. If a hit occurs, cache memory also returns the state and way information.

Configuration Register Read (CR): The processor provides a device and register address to cache memory, which returns the data value in the register over the bi-directional address bus.

Configuration Register Write (CW): The processor provides the device and register address along with a data value on the bi-directional address bus that cache memory writes into the addressed register. Cache memory may return an error message.

Due to the partitioning of control in the present invention, multiple types of cache memory organizations may be utilized with the processor of the present invention. The cache memory is only be able to satisfy the memory request from the processor according to its organization. This allows the L2 cache memory to be upgraded to a different organization in the future. In the present invention, the directory and data of the L2 cache memory operate independently. Because of this, the L2 cache memory can be upgraded independently.

Also, because the processor handles all L2 cache memory look-ups, a miss to the L2 cache memory does not stall accesses on the system bus. For example, if the processor sends memory requests for addresses A, B and C to the L2 cache memory, a miss to address A in the prior art would tie up the bus even though data corresponding to addresses B and C are in the L2 cache memory. Thus, if data of address A is not in cache memory, the data at addresses B and C in the cache memory could not be obtained until the memory request to address A was satisfied. In the present invention, because the processor contains all the control logic, when a miss occurs, the processor can send the request out on the system bus while continuing to send requests to the L2 cache memory for data corresponding to addresses B and C.

Figure 3:
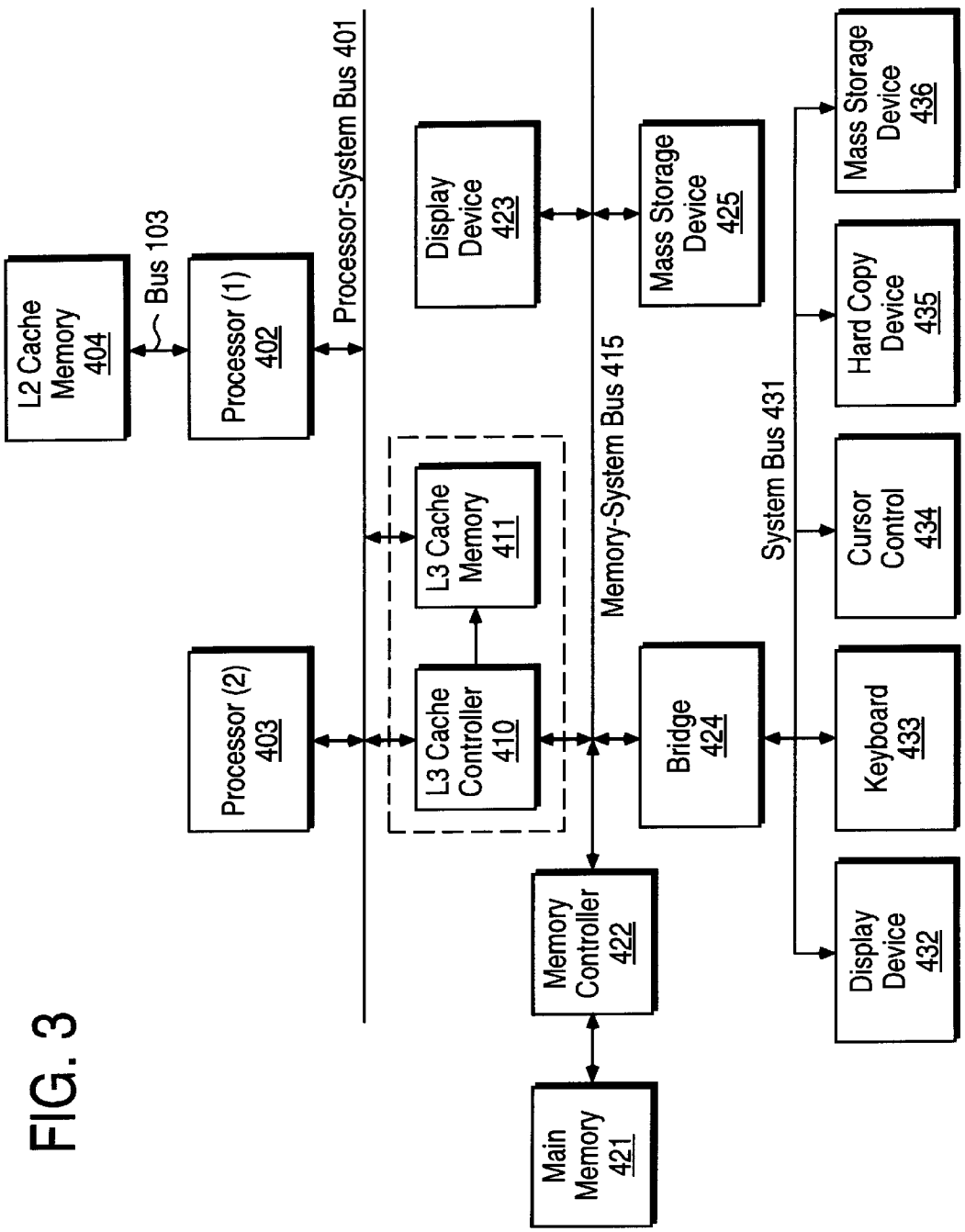
FIG. 3 is a diagram of one embodiment of the computer system of the present invention.

The processor and the L2 cache memory in the present invention may be integrated in a computer system such as that in FIG. 3. Referring to FIG. 3, an overview of a computer system of the present invention is shown in block diagram form. It will be understood that while FIG. 3 is useful for providing an overall description of the computer system of the present invention, a number of details of the system are not shown.

The computer system of FIG. 3, as may be utilized by the preferred embodiment of the present invention, generally comprises of processor-system bus 401 and processor 402 coupled to processor-system bus 401 for processing information. In the present invention, processor-system bus 401 includes address, data and control buses. In the currently preferred embodiment, processor 402 includes an internal L1 cache memory, that temporarily stores data and instructions on-chip. L2 cache memory 404 is coupled to processor 402 via dedicated cache bus 103 for temporarily storing data and instructions for use by processor 402.

Also coupled to processor-system bus 401 is processor 403 for processing information in conjunction with processor 402. Processor 403 may comprise a parallel processor, such as a processor similar to or the same as processor 402. A level three (L3) cache memory 411 for temporarily storing data and instructions for use by other devices in the computer system (e.g., processor 402, processor 403, etc.) and a L3 cache controller 410 for controlling access to L3 cache memory 411 may also be coupled to processor-system bus 401. The L3 cache controller 410 is also coupled to memory-system bus 415.

Memory controller 422 is coupled to memory-system bus 415 for controlling access to a random access memory (RAM) 421. Mass data storage device 425, such as a magnetic disk and disk drive and display device 423 may be coupled to memory-system bus 415.

I/O bridge 424 is coupled to memory-system bus 415 and system bus 431 to provide a communication path or gateway for devices on either memory-system bus 415 or system bus 431 to access or transfer data between devices on the other bus. Specifically, I/O bridge 424 transfers the data from system bus 431 to memory-system bus 415.

System bus 431 communicates information between devices in the computer system. Devices that may be coupled to system bus 431 include display device 432, an alphanumeric input device 433 and a cursor control device 434. Moreover, a hard copy device 435 and mass storage device 436 may also be coupled to system bus 431.

Of course, certain implementations and uses of the present invention may not require nor include all of the above components. For example, in certain implementations, the L3 cache controller and L3 cache memory may not be required. In such implementations processors (402) and (403) will reside directly on memory-system bus 415.

Figure 4A:
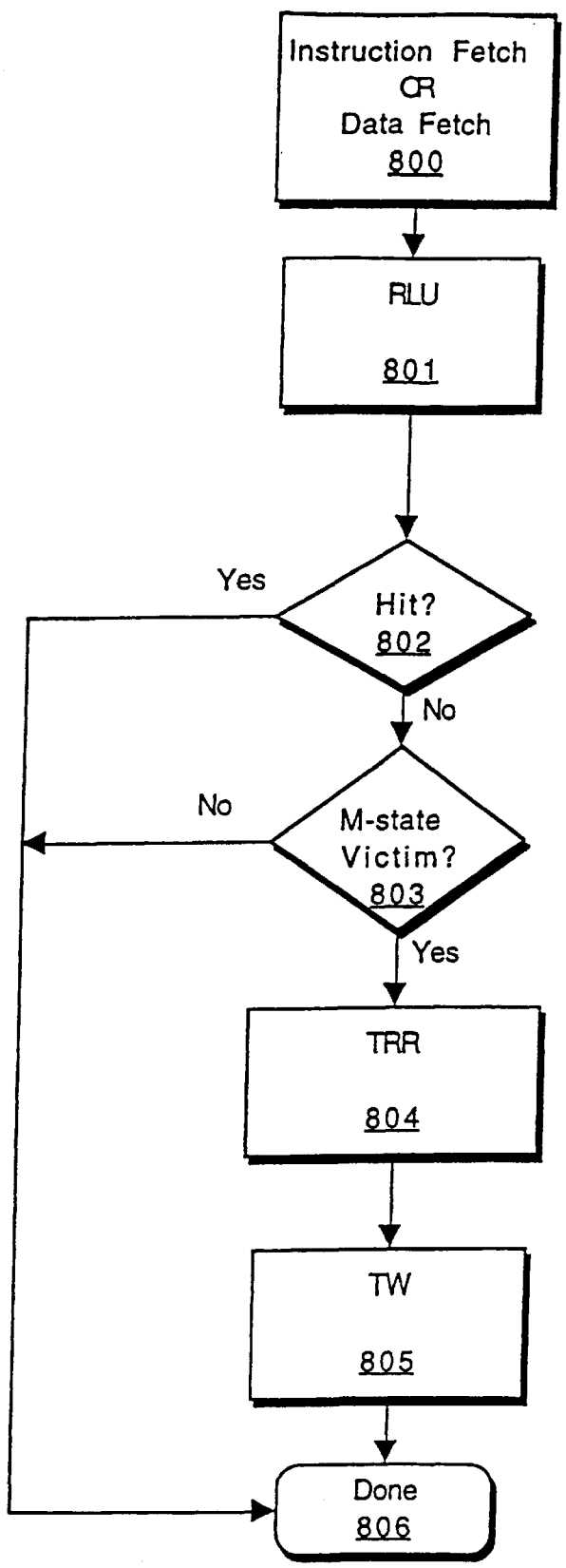
FIG. 4A is a flow diagram of one embodiment of an Instruction/Data Fetch sequence according to the present invention.

FIG. 4A is a flow diagram of one embodiment of an Instruction/Data Fetch operation according to the present invention. From the perspective of the sequence of L2 micro-operations that appear on the dedicated cache bus, the Instruction Fetch and the Data Fetch instructions, shown in process block 800, are the same. The first micro-operation issued by BBL 303 is an RLU micro-operation, shown in process block 801. If the lookup results in a hit in process block 802, the sequence is complete, shown by process block 806. If a miss occurs, and a clean victim is selected in process block 803, the sequence is complete. If the selected victim is modified, it is read out with a TRR micro-operation in process block 804. Then the victim is invalidated with a TW micro-operation in process block 805. The sequence is then complete, as shown by process block 806.

Figure 4B:
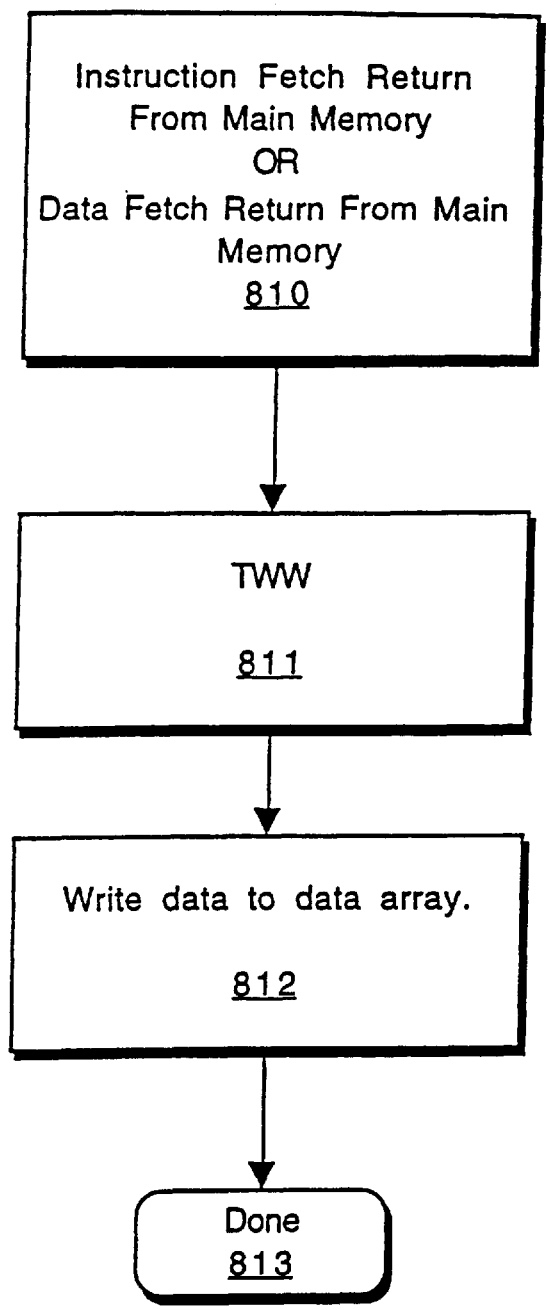
FIG. 4B is a flow diagram of one embodiment of an Instruction/Data Fetch Return From Main Memory sequence according to the present invention.

FIG. 4B is a flow diagram of one embodiment of an Instruction/data fetch return from main memory operation according to the present invention. When a cache line has been returned from main memory via the system bus and is ready to be placed in the L2 cache, as shown by process block 810, BBL 303 issues a TWW micro-operation shown in process block 811. The data that comprise the cache line are then written into the L2 data array as shown by process block 812. The sequence is then complete as shown by process block 813.

Figure 4C:
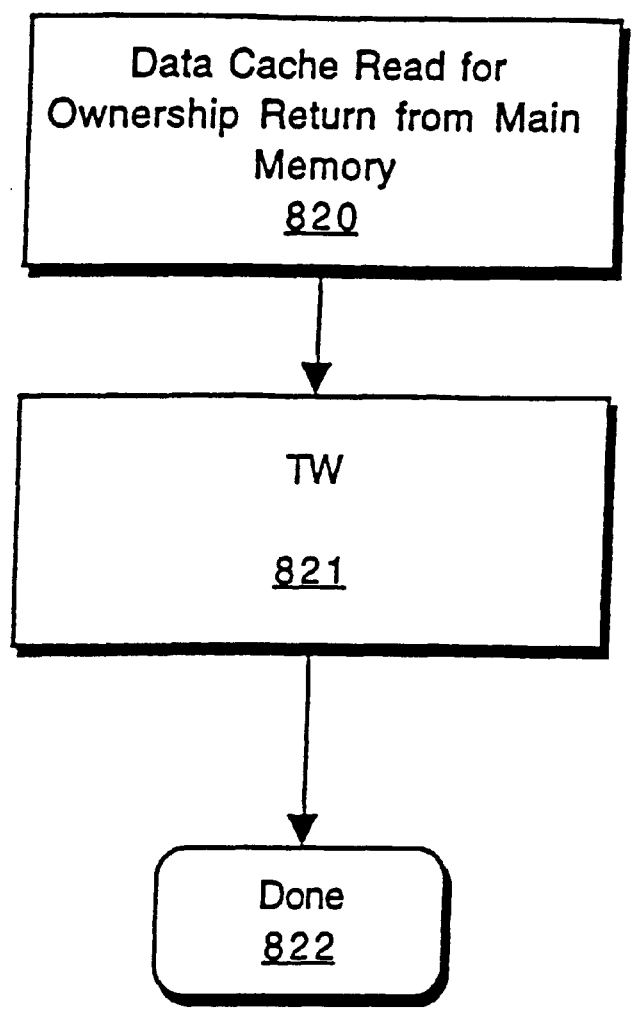
FIG. 4C is a flow diagram of one embodiment of a Data Cache Read For Ownership Return from Main Memory sequence according to the present invention.

FIG. 4C is a flow diagram of one embodiment of a Data Cache Read For Ownership Return from Main Memory operation according to the present invention. This sequence differs slightly from the sequence shown in FIG. 4B in that the data does not have to be written into the L2 cache because it is written into the L1 cache instead. Thus, in response to a Data Cache Read for Ownership Return from Main Memory operation, shown in process block 820, BBL 303 issues a TW micro-operation to allocate the line into the L2 cache shown in process block 821. The sequence is then complete, as shown by process block 822.

Figure 4D:
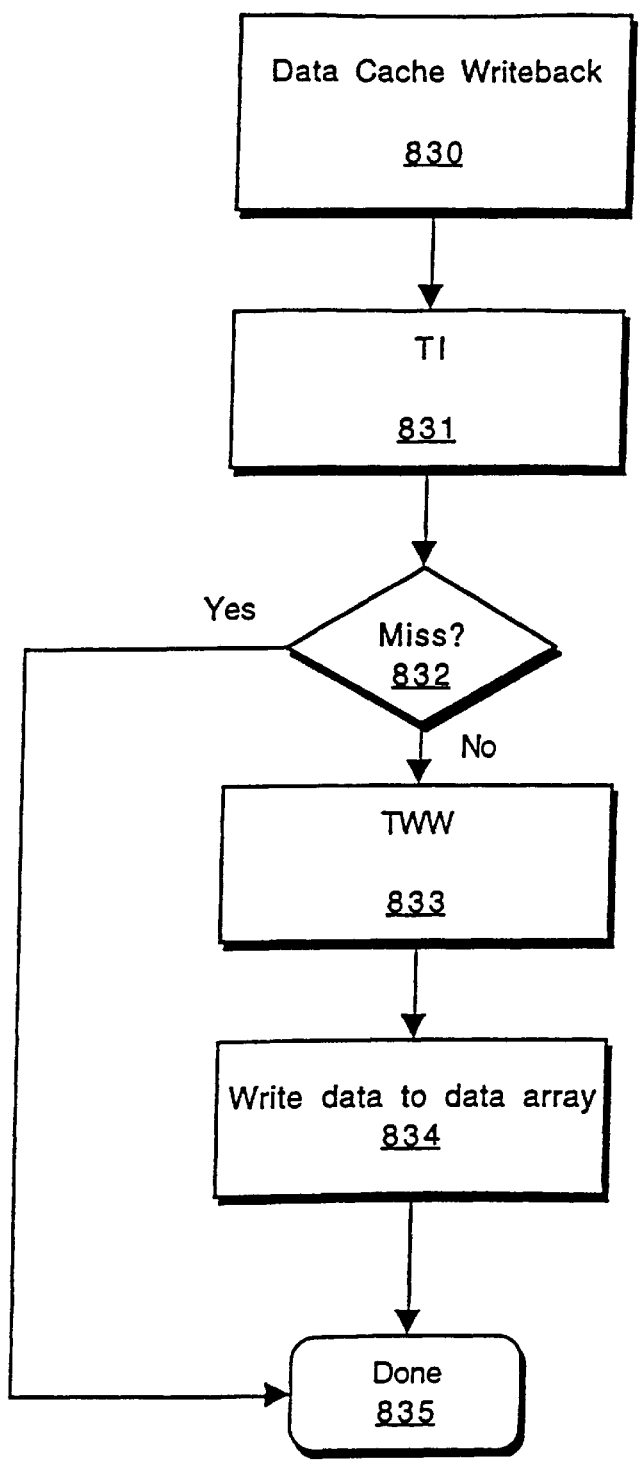
FIG. 4D is a flow diagram of one embodiment of a Data Cache Writeback sequence according to the present invention.

FIG. 4D is a flow diagram of one embodiment of a Data Cache Writeback operation according to the present invention. When a modified cache line is evicted from the L1 cache, it is written to the L2 cache. Because inclusion is not guaranteed in the cache hierarchy, the line may not be present in the L2 cache. Thus, when a Data Cache Writeback operation, as shown in process block 830, is performed, BBL 303 issues a TI micro-operation, shown in process block 831, to determine whether the line is present in the L2 cache, shown in process block 832. If the line is not present in the L2 cache, the sequence is complete, as shown by process block 835. Otherwise, a TWW micro-operation is issued, as shown in process block 833. Subsequently, the data that comprise the cache line are written to the data array of the L2 cache, as shown in process block 834. The sequence then completes in process block 835.

Figure 4E:
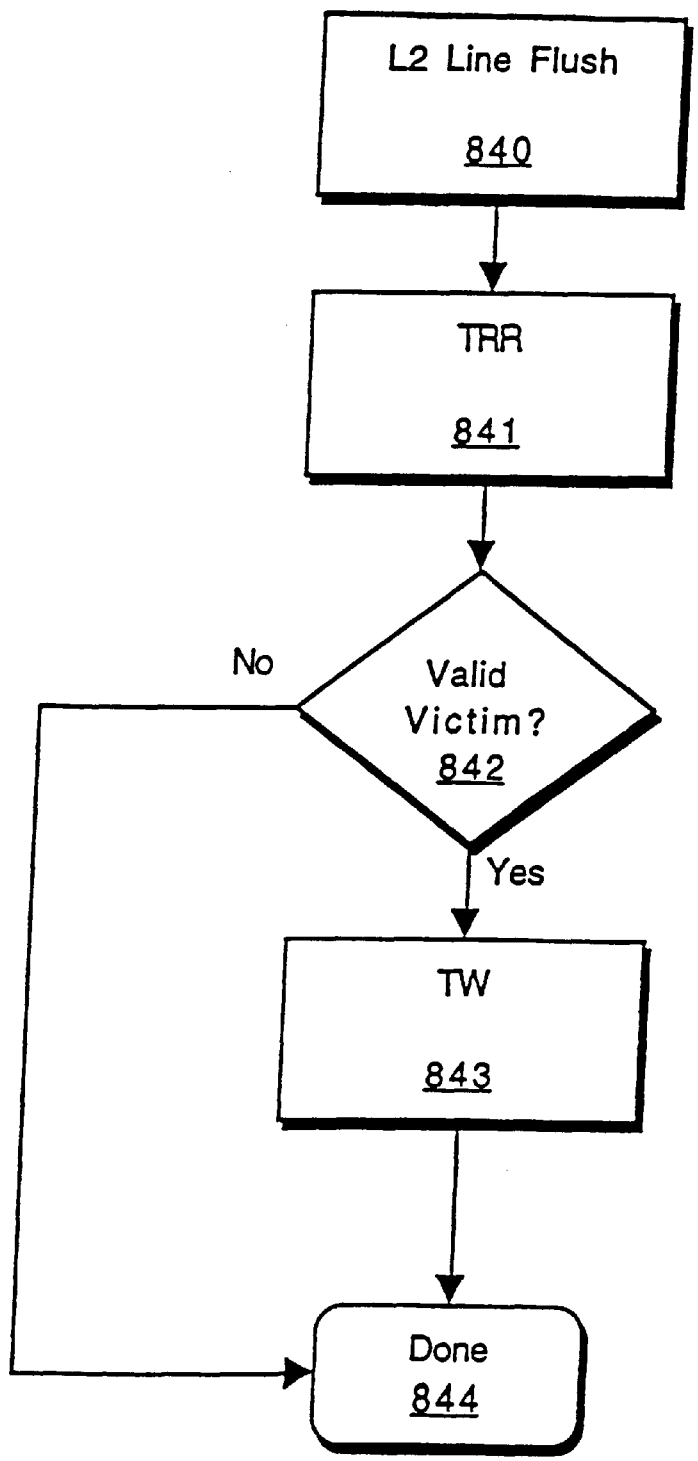
FIG. 4E is a flow diagram of one embodiment of an L2 Line Flush sequence according to the present invention.

FIG. 4E is a flow diagram of one embodiment of an L2 Line Flush operation according to the present invention. When the L2 cache is to be flushed, the sequence of FIG. 4E is performed for each line in the L2 cache. The sequence begins with an L2 Line Flush operation, shown by process block 840. In response, BBL 303 issues a TRR micro-operation in process block 841. If the line read out is invalid, the sequence is completed in process block 844. If the line read out is valid, BBL 303 issues a TW micro-operation in process block 843 to invalidate the line. The sequence is then completed in process block 844.

Figure 4F:
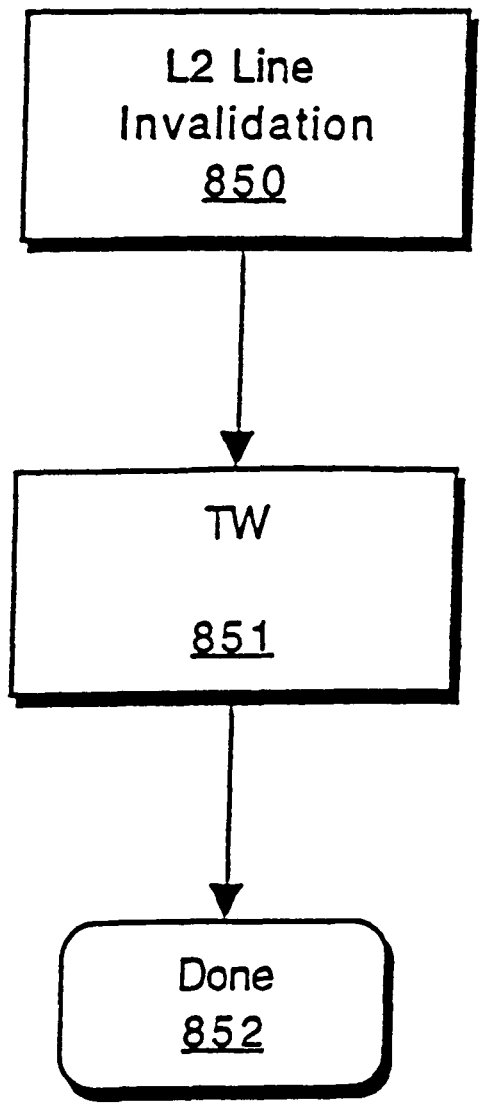
FIG. 4F is a flow diagram of one embodiment of an L2 Line Invalidation sequence according to the present invention.

FIG. 4F is a flow diagram of one embodiment of an L2 Line Invalidation operation according to the present invention. When the L2 cache is to be invalidated the sequence of FIG. 4F is performed for each line in the L2 cache. In response to an L2 Line Invalidation operation shown in process block 850, BBL 303 issues a TW micro-operation in process block 851 to invalidate a cache line. The sequence is then complete in process block 852 and repeated for subsequent lines, if necessary.

Figure 4G:
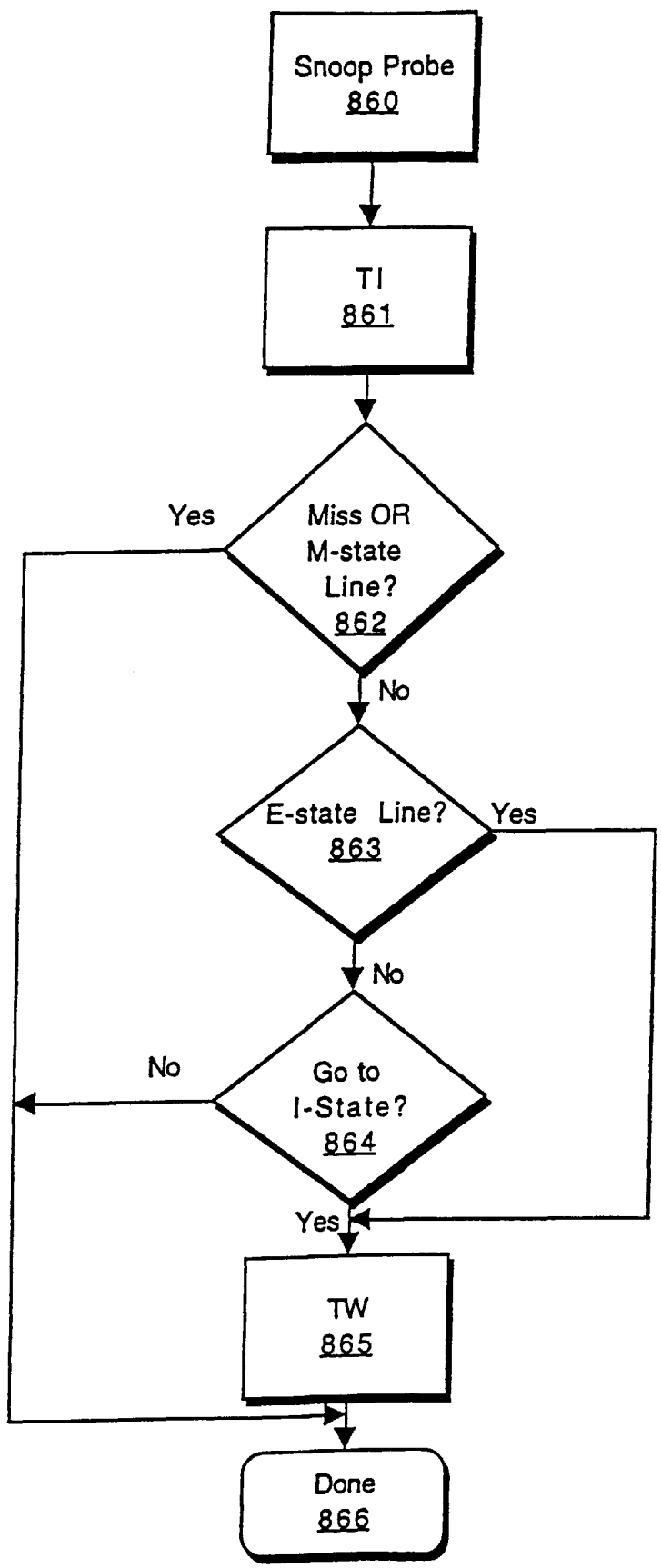
FIG. 4G is a flow diagram of one embodiment of a Snoop Probe sequence according to the present invention.

FIG. 4G is a flow diagram of one embodiment of a Snoop Probe operation according to the present invention. In response to a Snoop Probe operation, shown in process block 860, BBL 303 issues a TI micro-operation, shown in process block 861. If the TI results in a miss or a hit to a modified line, in process block 862, the sequence is completed in process block 866. In the case of a modified line, a Snoop Confirm operation is used to complete the snoop process. If the line is marked as exclusive, as determined in process block 863, a TW micro-operation is issued in process block 865 to change the state to Shared (S) or Invalid (I). If the line is a shared line, as determined in process block 863, and the target state is also Shared (S), then the process is complete. Otherwise, a TW micro-operation is issued in process block 865 to change the line to Invalid (I).

Figure 4H:
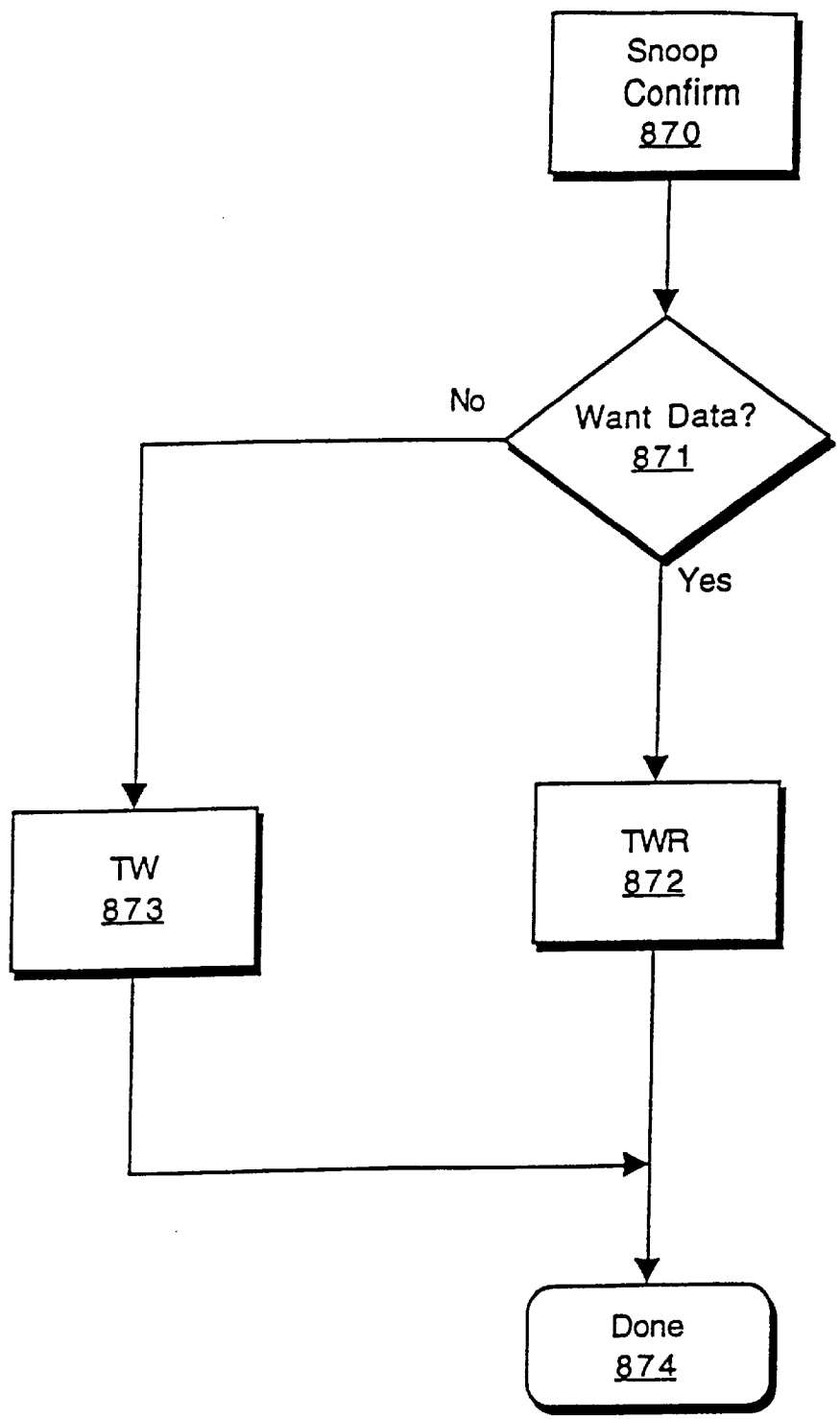
FIG. 4H is a flow diagram of one embodiment of a Snoop Confirm sequence according to the present invention.

FIG. 4H is a flow diagram of one embodiment of a Snoop Confirm operation according to the present invention. A Snoop Confirm operation is performed if a Snoop Probe operation hits a modified line, which requires a state update to be performed and may require data to be returned; however, the most up to date copy of the data may not be present in the L2 cache (i.e., more modified data may exist in the L1 cache). In this case, the data will be obtained from the L1 cache and only the state in the L2 cache needs to be updated. The Snoop Confirm, in process block 870, indicates that a state update is necessary, and whether data is required. If the Snoop Confirm requires data, as determined in process block 871, BBL 303 issues a TWR micro-operation in process block 872. Otherwise, BBL 303 issues a TW micro-operation in process block 873. The sequence is then complete in process block 874.

Cache Interface Signals

In one embodiment, the interface between the processor and cache is composed of five groups of signals. These groups are:

1. Transaction Request Signals.
2. Transaction Response Signals.
3. Data Signals.
4. RAM Control Signals (in one embodiment, these are BSRAM control signals).
5. General Signals.

In other embodiments, some of these signals are not included.

For L2 cache configurations that make use of tag RAM(s) and BSRAMs, an additional group of signals, the BSRAM Address Signals, are used as an interface between these components. In one embodiment, this interface only exists between the tag SRAM(s) and the BSRAMs.

One embodiment of the signals in the groups are described below.

Transaction Request Signals

This group of signals connects the processor to either the cache RAM(s) or tag SRAM(s). The signals in this group are:

Cache Address (CA)

In one embodiment, the CA bus is 33 bit wide bus that carries the address from the processor to the cache. The address is driven on to this bus and held stable for a minimum of one cache clock cycle. The bus is bi-directional and also carries the victim cache line address from the tag, SRAM(s) or cache RAM to the processor, in response to a request for this information. The width of this bus can be limited, as necessary, to accommodate processors and caches that do not require the entire 36 bits of address. Other CA bus widths may also be used that may be include a greater or fewer number of address bits.

Cache Address Parity (CAP)

This bus carries the two parity bits covering the Cache Address bus described above. In one embodiment, the lower order parity bit, CAP[0] covers the lower 16 bits, CA[20:5], of the bus wile the upper parity bit CAP[1] is computed across the upper bits, CA[35:21]. In case the address bus width is less than 36 bits, the coverage provided by CAP[1] is adjusted accordingly assuming that the higher order bits are zero. The CAP bits carry valid parity along with the CA bus signals. This bus is bi-directional and valid one cache clock phase after the address when the bus is operating at full speed, and one cache clock cycle after the address otherwise. Of course, different CA bus widths may result in a different number of CAP bits.

Cache Command (CCMD)

This bus carries commands (referred to above as a micro-operation) from the processor to the cache. The commands on this bus control the tag SRAM or the SRAMs of the cache via the cache control circuit. The commands supported by the interface are shown in Table 1. This bus is unidirectional and valid for a period no less than one cache clock cycle.

Cache Way (CWY)

In a four-way set-associative cache embodiment, the two bits on this bus carry the way information from the processor to the cache whenever the processor has to address a specific way in a set. These bus signals are unidirectional and are valid for a period no less than one cache clock cycle and driven out at the same time as the Cache Command. Commands that use the way information are shown in Table 1. Of course, alternative cache configurations may result in a different number of way signals.

Command Address Strobe (CADS)

In one embodiment, this signal is driven by the processor to initiate every cache transaction on the bus. It is a unidirectional signal and is active for one cache clock phase when the bus is operating at the full frequency of the processor. It is active for one cache clock cycle when the bus is operating at a fraction of the processor frequency.

TABLE 1

| | Command Encoding | | |
|---|---|---|---|
| Transaction | CCMD[4:2] | CCMD[1:0] | CWY[1:0] |
| Data Line Read w/ LRU update (RLU) | 011 | 00 | XX |
| Read Half Line w/ LRU Update (RHU)* | 011 | 01 | XX |
| Tag Read w/ Data Read (TRR) | 011 | 10 | Way |
| Tag Write w/ Line Read (TWR) | 010 | State | Way |
| Tag Write w/ Data Write (TWW) | 111 | State | Way |
| Tag Write w/ Half Line Write (TWH)* | 110 | State | Way |

TABLE 1-continued

Command Encoding

| Transaction | CCMD[4:2] | CCMD[1:0] | CWY[1:0] |
|---|---|---|---|
| Tag Write w/ Chunk Write (TWC)* | 101 | State | Way |
| Tag Write (TW) | 100 | State | Way |
| Tag Inquire (TI) | 011 | 11 | XX |
| Configuration Register Read (CR) | 000 | 10 | XX |
| Configuration Register Write (CW) | 000 | 11 | XX |
| Reserved | 000 | 0X | XX |
| Reserved | 001 | XX | XX |

*In one embodiment, these commands are optional and need not be implemented in every processor/cache combination.

Command Parity (CCP)

In one embodiment, this signal is the parity bit that covers the cache command (CCMD[4:0]) and way (CWY[1:0]) signals. The signal is valid one cache clock phase after the signals it covers when the bus is operating at full speed, and one cache clock cycle after those signals otherwise. It is a unidirectional signal and driven by the processor for a period no less than one cache clock cycle.

Transaction Response Signals

In one embodiment, certain cache transactions initiated by the processor over the Transaction Request group of signals produce a response from the cache that is carried over this group of signals. These signals are:

Cache Return (CRTN)

According to one embodiment, five signals carry the status of cache tag from the tag SRAM or cache SRAMs to the processor. The encoding of these signals is shown in Table 2. These signals are unidirectional and valid for a period no less than one cache clock cycle and are held on the bus through "keepers" until a new value is driven out.

TABLE 2

Response Return Encoding

| Transaction | RTN[4] | RTN[3:2] | RTN[1:0] |
|---|---|---|---|
| Data Read w/ LRU HIT | Hit | State | Way |
| Data Read w/ LRU MISS | Miss | Victim State | Victim Way |
| Tag Read w/ Data Read | X | Victim State | X |
| Tag Inquire HIT | Hit | State | Way |

Cache Synchronous Error (CSER)

In one embodiment, this signal is issued by the tag SRAM or cache SRAM to indicate the error status of the cache in response to the command it has just received from the processor. The error is signaled in the same cycle as the response from the cache. This signal is unidirectional and is active for no less than one cache clock cycle.

Cache Return Parity (CRP)

In one embodiment, this parity signal covers the cache return one cache clock phase after the signals it covers when the bus is operating at full speed, and one cache clock cycle after those signals otherwise. It is a unidirectional signal given by the tag SRAM or cache SRAM to the processor. It is active for a period of no less than one cache clock cycle. Of course, alternative parity schemes may cover the cache return signals.

Cache Return Strobe (CSTB)

In one embodiment, this strobe signal is issued to clock the response signals into the processor when source-synchronous mode is used for operation at high frequencies. It is driven by the cache for a period of a cache clock phase with a fixed timing relationship to the rest of the signals in this group. This signal is optional on the processor. It need only be used if the processor cannot guarantee correct sampling at the frequency of operation. In alternative non-source-synchronous embodiments, the CSTB may be replaced with a clock signal.

Data Signals

According to one embodiment, this group of signals runs between the processor and the data port of the cache SRAMs or the BSRAMs. In one embodiment, the signals in this group are:

Data Bus (BD)

In one embodiment, the BD is a 64 bit wide bus that carries the data between the cache and processor. It connects to either the data port of the cache SRAM(s) or the BSRAMs. It is a bi-directional bus that is driven once every phase of the cache clock cycle in the full frequency mode of bus operation and once every cache clock cycle for fractional bus frequency modes. Of course, alternative embodiments, may vary to bus width to greater than or less than 64 bits.

Data Bus Integrity (BDI)

In a 64-bit BD embodiment, this bus provides eight signals between the processor and cache that are intended to carry data integrity signals for the data bus. This bus is optional and may not exist on systems where it is not needed. Caches that implement this feature are required to treat these eight bits per chunk the same as data, storing them in the data array and returning them to the processor when requested. The actual usage is dependent upon the implementation of the processor. As an example, they could be used as parity bits, carrying byte wide parity for the data bus. Alternatively, the processor may choose to implement an error correcting code (ECC) scheme and use these eight bits accordingly. The signals on this bus are bi-directional and are driven at the same time as the data bus. The processor must be able to disable checking data integrity for systems that do not implement the necessary storage for these bits. When implementing BD embodiments of sizes other than 64 bits, BDI is adjusted accordingly.

Data Bus Strobes (BSTB)

In one embodiment, this set of signals is composed of four pairs of complementary strobe signals. These signals are used to clock the transfer of data between the cache RAMs and the processor when the interface is running at high frequency. The strobe signals are bi-directional and are driven by the agent that is driving the data and data integrity busses, BD[63:0] and BDI[7:0]. The strobe signals capture the data in the de-skew latches in the receiving agent before transfer into its core. Each pair of strobe signals, consisting of a true and complementary signal, is associated with sixteen data bus signals and two data integrity signals. It is implemented with a tight skew relationship with respect to its corresponding bus signals. The strobes BSTB[3] and BSTB[3]# are associated with the data bus BD[63:48] and BDI[7:6] and so on, in order, for the remaining strobe pairs. Alternatively, a different number of strobe signals may be used, or in some embodiments, one or more clock signals may replace the strobes.

RAM Control Signals

This group of signals is designed to control the operation of the RAMs used for the data array of the cache. According to one embodiment, BSRAMs are used. The signals are unidirectional and are driven by the processor to the BSRAMs. All of these signals are used in the one half or lower bus frequency modes of operation and are always driven and are active for a period no less than one cache clock period.

This group contains the BSRAM signals that are required for this bus to work and is not intended to cover all the control signals provided on the current industry standard BSRAMs. BSRAMs provide a second ADS that must be tied inactive when used with this bus protocol. The byte write controls on the BSRAMs are also not used as part of this protocol. Of course, when other types of RAM are used, the control signals varied.

In one embodiment, the signals in this group are:

BSRAM Address Strobe (BADS#)

In one embodiment, this signal is the strobe that initiates all operations for the BSRAMs. It latches the address and control inputs into the BSRAMs. It is driven for exactly one cache clock period. It is connected to the ADSC# signal on the BSRAMs. The ADSP# address strobe on the BSRAMs is tied inactive.

Burst Advance (BADV#)

In one embodiment, this signal to the BSRAMs is driven by the processor during a burst read or write operation to increment the burst counter within the BSRAMs. The signal is latched by the cache clock and is active for up to three cache clock cycles.

BSRAM Write Enable (BWE#)

In one embodiment, this signal is used to indicate a write operation to the BSRAMs. The signal is valid for four cache clock periods. This signal is connected to the BW# input on the BSRAMs. The BW[3:0]# signals of the BSRAMs are tied inactive.

BSRAM Output Enable (BOE#)

In one embodiment, this signal is used to enable and disable the data output drivers of the BSRAMs. It is primarily used to control the turn around of the data bus for read to write cases. This signal is held inactive during all writes for the entire duration of the data transfer, and conversely, is held active during the data transfer of processor read cycles to the L2 cache memory.

General Control Signals

In one embodiment, the following set of signals are used to provide timing and control signals for the entire interface and are not transaction or protocol specific. They connect the processor to the cache tag, SRAM(s) and BSRAMs or the cache RAMs. The signals in this group are:

Cache Clock (CCLK)

In one embodiment, this set of four clocking signals are driven by the processor to the cache to provide all the necessary timing information for bus operation. There may be multiple copies of the same timing clock signal and may be presented in true and complement form. These signals have tight skew tolerance to each other. The L2 cache may use these clock signals to directly control the timing of the internal events, or it may use an internal clock multiplier and phase locked loop (PLL) to achieve a higher internal frequency.

In alternative embodiments, the number of cache clock signals may be varied. Alternatively, timing information may be provided by one or more strobe signals.

Cache Reset (CRST#)

In one embodiment, this signal is driven by the processor to the cache tag and cache RAMs to reset their internal state. This signal can be asserted asynchronously but its release is synchronous to cache clock.

Cache Synchronous Error (CSER)

In one embodiment, this signal is used by the cache subsystem to signal an error or failure to the processor. The errors indicated on this signal are associated with a specific command from the processor. It is provided as a catch-all error signal that is not considered recoverable by the processor. The signal is active high. The signal must be active for no less than one cache clock period.

BSRAM Address Signals

In one embodiment, this group of signals connect the tag SRAM(s) to the BSRAMs for the cache configurations based upon these devices. These signals are contained within the cache RAMs and are not part of the interface. In one embodiment, the signals in this group are:

BSRAM Set Address (BSA)

In one embodiment, these thirteen signals carry the set address from the cache tag SRAM to the BSRAMs to address up to a maximum of 8 k sets in the cache. These can correspond to processor address bits A[17:5] for the largest cache. These signals are driven by the tag SRAM to the BSRAMs forming the data array and are held valid until the next cache command that accesses the data array. These signals are connected to the address inputs A[14:4] of the BSRAMs. Of course the BSA may comprise a different number of signals depending on the size of the sets contained in the cache memory.

BSRAM Critical Chunk Address (BCA)

In one embodiment, these two address bits from the tag SRAM are driven to the least significant address bits of the BSRAMs. They provide the address of the chunk within the cache line that must be driven out first in the burst of data. The BSRAMs' internal burst counter starts at the value specified on these signals and proceeds in the burst order shown in Table 3. These signals are connected to address inputs A[1:0] of the BSRAMs. Alternatively, the BCA signals may comprise a different number of bits depending on the size of the chunks used.

TABLE 3

Burst order of data transfers

| Chunk Address | 00 | 01 | 10 | 11 |
|---|---|---|---|---|
| First Address | X..X00 | X..X01 | X..X10 | X..X11 |
| Second Address | X..X01 | X..X00 | X..X11 | X..X10 |
| Third Address | X..X10 | X..X11 | X..X00 | X..X01 |
| Fourth Address | X..X11 | X..X10 | X..X01 | X..X00 |

BSRAM Way Address (BWY)

In one embodiment, these two signals carry the way information to the BSRAMs. the signals are connected to the address lines A[3:2] of the BSRAMs and select amongst different memory locations that are logically treated as different ways. These signals are produced by a tag lookup and comparison, a path that has more latency than the rest of the BSRAM address signals. These signals are duplicated so that they have a lighter electrical load, making for shorter signal flight times, in order to compensate for this added latency. The implementation of this bus contains four physical signals which are unidirectional and driven from the Tag SRAM to the BSRAMs.

Connecting the BSRAMs

Table 4 below shows the order of interconnections between the tag SRAM(s) and the various BSRAM signals for a four way set-associative cache.

TABLE 4

Connections to the BSRAM signals.

| Protocol Signals | BSRAM Signals | Description |
|---|---|---|
| BCA[1:0] | A[1:0] | These must be the BSRAM lowest order address bits. |
| BWY[1:0] | A[3:2] | The way is selected with the next pair of address bits. |
| BSA[10:0] | A[14:4] | Signals can be connected in any order for best layout. |
| BSA[12:11]** | CE2, CE3# | Used as bank select signals. CE1# is wired active. |

**When multiple banks of BSRAM are used. Otherwise, these are the upper address bits.

What is claimed is:

1. A system comprising:
 a processor having a cache control circuit, the cache control circuit to control multiple types of cache memories, the processor having a first level cache coupled with the cache control circuit;
 a cache bus coupled to the processor; and
 a second level cache coupled with the cache control circuit via the cache bus;
 wherein the cache control circuit controls the first level cache and the second level cache by issuing one or more micro-operations from a set of micro-operations that are decoded and executed by the first level cache and the second level cache, respectively.

2. The system of claim 1, wherein the set of micro-operations include a data read with least recently used update (RLU) micro-operation that causes the second level cache to update a least recently used (LRU) field associated with a requested cache line, send the requested cache line to the processor, send a cache way from which the requested cache line was read to the processor, and send a state of the requested cache line to the processor.

3. The system of claim 1, wherein the set of micro-operations include a data half read with least recently used update (RHU) micro-operation that causes the second level cache to update a least recently used (LRU) field associated with a requested half cache line, send the requested half cache line to the processor, send a cache way from which the requested half cache line was read to the processor, and send a state of the requested half cache line to the processor.

4. The system of claim 1, wherein the micro-operations include a tag read with line read (TRR) micro-operation that causes the second level cache to send a requested cache line, a tag and a state associated with the requested cache line to the processor.

5. The system of claim 1, wherein the micro-operations include a tag write with line read (TWR) micro-operation that causes the second level cache to send a requested cache line to the processor and update a state associated with the requested cache line.

6. The system of claim 1, wherein the micro-operations include a tag write with data write (TWW) micro-operation that causes the second level cache to store a cache line sent by the processor and a tag and a state associated with the cache line.

7. The system of claim 1, wherein the micro-operations include a tag write with half data write (TWH) micro-operation that causes the second level cache to store a cache half line sent by the processor, a tag, and a state associated with the cache half line.

8. The system of claim 1, wherein the micro-operations include a tag write with chunk data write (TWC) micro-operation that causes the second level cache to store a chunk of data sent by the processor, a tag, and a state associated with the chunk of data.

9. The system of claim 1, wherein the micro-operations include a tag write (TW) micro-operation that causes the second level cache to update a tag and a state associated with a specified cache line.

10. The system of claim 1, wherein the micro-operations includes a tag inquire (TI) micro-operation that causes the second level cache to lookup a tag associated with a specified cache line and return results from the lookup to the processor.

11. The system of claim 1, wherein the micro-operations include a configuration register read (CR) micro-operation that causes the second level cache to send a data value associated with a specified device register to the processor.

12. The system of claim 1, wherein the micro-operations includes a configuration register write (CW) micro-operation that causes the second level cache to write a data value sent from the processor to a register associated with a specified device.

13. A processor comprising:
 a first level cache memory; and
 a cache control circuit to control multiple types of cache memory circuits, the cache control circuit having
  a first level cache interface coupled to the first level cache, wherein the cache control circuit communicates one or more micro-operations from a set of micro-operations that are decoded and executed by the first level cache, and a second level cache interface to communicate one or more micro-operations to a second level cache that decodes and executes the micro-operations, if the second level cache is communicatively coupled to the second level cache interface.

14. The processor of claim 13, wherein the set of micro-operations include a data read with least recently used update (RLU) micro-operation that causes the second level cache to update a least recently used (LRU) field associated with a requested cache line, send the requested cache line to the processor, send a cache way from which the requested cache line was read to the processor, and send a state of the requested cache line to the processor.

15. The processor of claim 13, wherein the set of micro-operations include a data half read with least recently used update (RHU) micro-operation that causes the second level cache to update a least recently used (LRU) field associated with a requested half cache line, send the requested half cache line to the processor, send a cache way from which the requested half cache line was read to the processor, and send a state of the requested half cache line to the processor.

16. The processor of claim 13, wherein the micro-operations include a tag read with line read (TRR) micro-operation that causes the second level cache to send a requested cache line, a tag and a state associated with the requested cache line to the processor.

17. The processor of claim 13, wherein the micro-operations include a tag write with line read (TWR) micro-operation that causes the second level cache to send a requested cache line to the processor and update a state associated with the requested cache line.

18. The processor of claim 13, wherein the micro-operations include a tag write with data write (TWW) micro-operation that causes the second level cache to store a cache line sent by the processor and a tag and a state associated with the cache line.

19. The processor of claim 13, wherein the micro-operations include a tag write with half data write (TWH) micro-operation that causes the second level cache to store a cache half line sent by the processor, a tag, and a state associated with the cache half line.

20. The processor of claim 13, wherein the micro-operations include a tag write with chunk data write (TWC) micro-operation that causes the second level cache to store a chunk of data sent by the processor, a tag, and a state associated with the chunk of data.

21. The processor of claim 13, wherein the micro-operations include a tag write (TW) micro-operation that causes the second level cache to update a tag and a state associated with a specified cache line.

22. The processor of claim 13, wherein the micro-operations includes a tag inquire (TI) micro-operation that causes the second level cache to lookup a tag associated with a specified cache line and return results from the lookup to the processor.

23. The processor of claim 13, wherein the micro-operations include a configuration register read (CR) micro-operation that causes the second level cache to send a data value associated with a specified device register to the processor.

24. The processor of claim 13, wherein the micro-operations includes a configuration register write (CW) micro-operation that causes the second level cache to write a data value sent from the processor to a register associated with a specified device.

25. A method comprising:

sending, selectively, a micro-operation from a set of micro-operations to control multiple types of cache memories, from a processor located on a first die to a cache memory circuit located on the first die or to a cache memory circuit located on a second die via a cache bus;

decoding the micro-operation by the cache memory receiving the micro-operation;

executing the micro-operation by the cache memory receiving the micro-operation; and sending results, if indicated by the micro-operation, to the processor.

26. The method of claim 25, wherein the set of micro-operations include a data read with least recently used update (RLU) micro-operation that causes the second level cache to update a least recently used (LRU) field associated with a requested cache line, send the requested cache line to the processor, send a cache way from which the requested cache line was read to the processor, and send a state of the requested cache line to the processor.

27. The method of claim 25, wherein the set of micro-operations include a data half read with least recently used update (RHU) micro-operation that causes the second level cache to update a least recently used (LRU) field associated with a requested half cache line, send the requested half cache line to the processor, send a cache way from which the requested half cache line was read to the processor, and send a state of the requested half cache line to the processor.

28. The method of claim 25, wherein the micro-operations include a tag read with line read (TRR) micro-operation that causes the second level cache to send a requested cache line, a tag and a state associated with the requested cache line to the processor.

29. The method of claim 25, wherein the micro-operations include a tag write with line read (TWR) micro-operation that causes the second level cache to send a requested cache line to the processor and update a state associated with the requested cache line.

30. The method of claim 25, wherein the micro-operations include a tag write with data write (TWW) micro-operation that causes the second level cache to store a cache line sent by the processor and a tag and a state associated with the cache line.

31. The method of claim 25, wherein the micro-operations include a tag write with half data write (TWH) micro-operation that causes the second level cache to store a cache half line sent by the processor, a tag, and a state associated with the cache half line.

32. The method of claim 25, wherein the micro-operations include a tag write with chunk data write (TWC) micro-operation that causes the second level cache to store a chunk of data sent by the processor, a tag, and a state associated with the chunk of data.

33. The method of claim 25, wherein the micro-operations include a tag write (TW) micro-operation that causes the second level cache to update a tag and a state associated with a specified cache line.

34. The method of claim 25, wherein the micro-operations includes a tag inquire (TI) micro-operation that causes the second level cache to lookup a tag associated with a specified cache line and return results from the lookup to the processor.

35. The method of claim 25, wherein the micro-operations include a configuration register read (CR) micro-operation that causes the second level cache to send a data value associated with a specified device register to the processor.

36. The method of claim 25, wherein the micro-operations includes a configuration register write (CW) micro-operation that causes the second level cache to write a data value sent from the processor to a register associated with a specified device.

* * * * *